Figure 1:
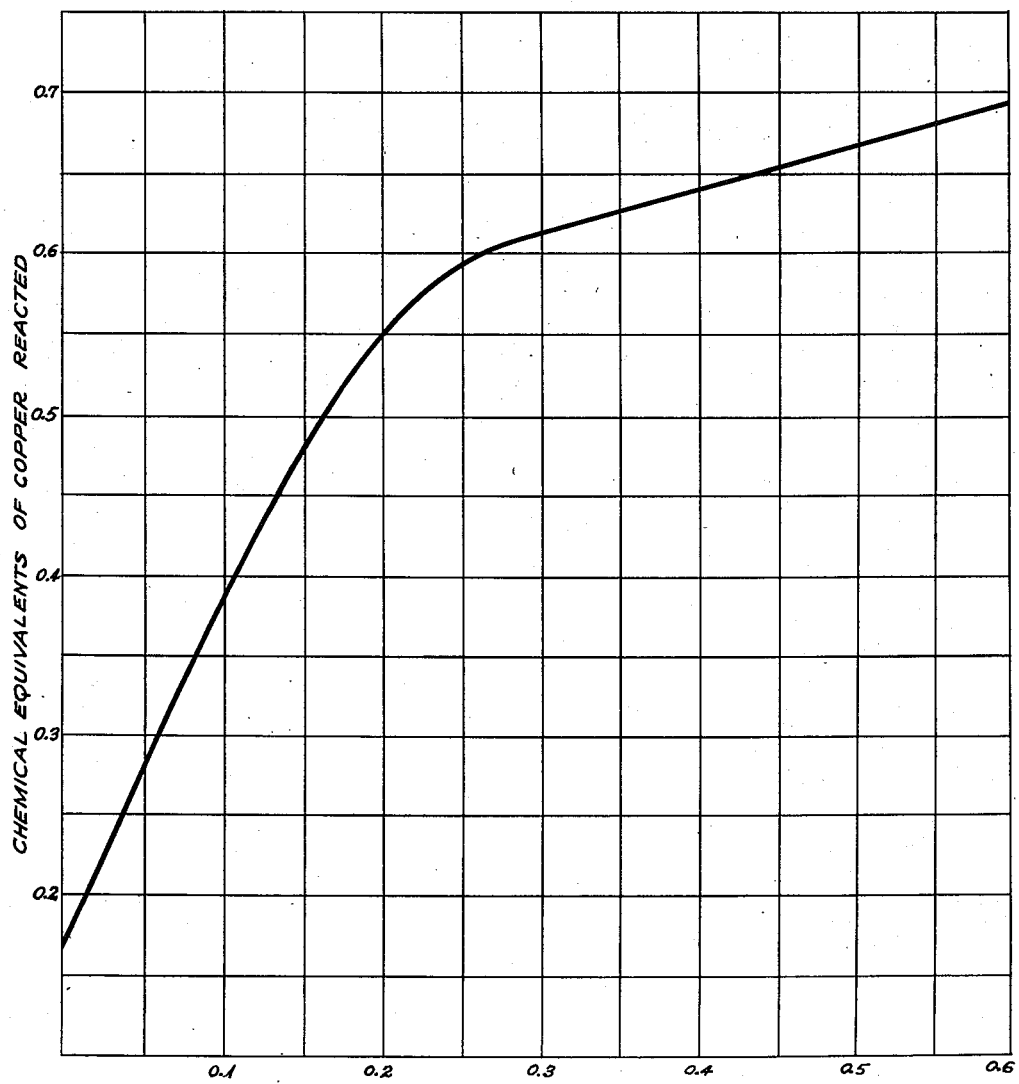

Oct. 30, 1951     E. FARBER     2,573,252
PROCESS FOR PREPARING CUPRIC AMMONIUM ARSENITE SOLUTIONS
Filed May 24, 1949     3 Sheets—Sheet 1

RATIO CHEMICAL EQ. $AS_2O_3$ / CHEMICAL EQ. $NH_3$
ORIGINAL REACTION MIXTURE
CONCENTRATION $NH_3$ CONSTANT AT 2 EQUIVALENTS PER LITER

INVENTOR.
*Eduard Farber*
BY
ATTORNEYS

Patented Oct. 30, 1951

2,573,252

UNITED STATES PATENT OFFICE 2,573,252

PROCESS FOR PREPARING CUPRIC AMMONIUM ARSENITE SOLUTIONS

Eduard Farber, Washington, D. C., assignor to Timber Engineering Company, Washington, D. C., a corporation of Delaware Application May 24, 1949, Serial No. 95,082

4 Claims. (Cl. 23—53)

This invention relates to cupric ammonium arsenite wood impregnating solutions. More particularly, the invention relates to a process whereby such solutions may be prepared directly from metallic copper.

Ammoniacal solutions containing cupric ammonium arsenite have long been utilized as wood impregnating compositions. These solutions are of great value for the reason that they rapidly effect penetration of the wood and, upon evaporation of volatile matter contained therein, deposit in the wood fibers toxic copper arsenite salts which are essentially water-insoluble and hence do not leach out appreciably when the impregnated wood is exposed to moisture. Wood so impregnated is thus effectively protected against the ravages of fungi, termites, insects, and other destructive organisms.

Cupric ammonium arsenite wood impregnating solutions have been variously prepared by dissolving cupric arsenite in an excess of ammonium hydroxide; by dissolving both copper sulfate or a similar cupric salt, and arsenious oxide in an excess of ammonium hydroxide; and by first precipitating cupric hydroxide by the addition of a strong base to an aqueous solution of a cupric salt, removing the mother liquor and dissolving the cupric hydroxide and a predetermined amount of arsenious oxide in an excess of ammonium hydroxide.

All of these methods are disadvantageous, however, in that the solutions resultant therefrom contain water-soluble salts which are ultimately deposited in the impregnated wood.

This condition obtains despite measures designed to preclude it such as the aforementioned method which entails the initial precipitation and removal of cupric hydroxide from a cupric salt solution.

As a consequence of this fact, wood impregnated with the solutions resultant from the above-mentioned processes demonstrate an undesirably high degree of electrical conductivity.

This fact is of particular significance with respect to wooden poles, cross-arms, and the like, employed to carry electrical wires. Impregnating solutions which appreciably increase the conductivity of the treated wood may not feasibly be employed to effect the preservation of poles and similar materials employed for such purposes.

It is also known that solutions containing cupric ammonium hydroxide may be prepared by aerating a suspension of metallic copper in ammonium hydroxide.

Such a method is completely infeasible as a means for the production of cupric hydroxide for use in the preparation of wood impregnating solutions, however, for the reason that it entails the use of concentrated ammonium hydroxide and aeration for a period of at least several hours to effect the reaction of a significant amount of copper.

Now, in accordance with this invention, it has been discovered that cupric ammonium arsenite wood impregnating solutions may be prepared by contacting with a free oxygen containing gas metallic copper contained in a dilute aqueous ammoniacal solution of arsenious oxide said aqueous ammoniacal solution containing from about one to about three chemical equivalents of dissolved ammonia per liter and from about 0.25 to about 0.6 chemical equivalents of dissolved arsenious oxide per equivalent of dissolved ammonia.

By so adjusting the relative proportions of dissolved arsenious oxide and dissolved ammonia, there may be produced by a short period of aeration a cupric ammonium arsenite wood impregnating solution of the proper concentration.

Inasmuch as relatively inexpensive reactants such as metallic copper and air are employed in the process of this invention, cupric ammonium arsenite wood impregnating solutions may be prepared thereby far more economically than by previously known processes.

Furthermore, by virtue of the fact that cupric ammonium arsenite solutions are prepared in accordance with this invention directly from metallic copper, there is present in the material deposited by the volatilization of the ammonia and water, no appreciable quantity of water-soluble, ionizable salts.

Hence wood impregnated with solutions resultant from the process of this invention is characterized by a remarkably low degree of electrical conductivity.

In addition, the toxic cupric arsenite salts deposited in wood impregnated with the solutions resultant from the process of this invention are not subject to removal therefrom by leaching.

The following examples are offered as specific embodiments of the process of this invention:

EXAMPLE I

A quantity of two normal ammonium hydroxide was prepared from the five normal product by dilution with required amount of distilled water.

In five equivalent portions of this two normal ammonium hydroxide contained in open vessels, were respectively dissolved, 0, 0.12, 0.5, 0.7 and 1.2 chemical equivalents per liter of arsenious oxide.

Into each of the resultant five solutions was placed an equal quantity of small particles of copper wire screen. In all instances, however, there was utilized a substantial stoichiometric excess of metallic copper with respect to the dissolved arsenious oxide present.

Air was passed through each of the reaction mixtures at the rate of from about 6 to about 15 cubic feet per hour per liter of the original ammoniacal solution for a period of one-half hour.

The reactions were effected at atmospheric pressure and were initiated at room temperature and were not permitted to rise above 30° C. at any time.

The results of the foregoing experiments are tabulated in Table I, and are graphically represented by Figure I. As is apparent from an examination of the figure it is essential that there be present in the reaction mixture at least about 0.25 equivalent of arsenious oxide per equivalent of dissolved ammonia.

*Table I*

[All data are in chemical equivalents per liter]

| Composition of Original Reaction Solution | | | Copper Dissolved | Ratio $NH_4^+$ original Soln./Cu Dissolved |
|---|---|---|---|---|
| $NH_3$ | $As_2O_3$ | Ratio $As_2O_3/NH_3$ | | |
| 2 | 0.00 | 0.00 | 0.17 | 12.0 |
| 2 | 0.12 | 0.06 | 0.30 | 6.7 |
| 2 | 0.50 | 0.25 | 0.60 | 3.3 |
| 2 | 0.70 | 0.35 | 0.62 | 3.2 |
| 2 | 1.20 | 0.60 | 0.70 | 3.0 |

Attention is invited to the fact that the above data were obtained by experiments with original reaction solutions 2 normal with respect to ammonia concentrations. Analogous results are obtained, as the normality of ammonia in the original reaction mixture is varied over the range of from about one to about three.

EXAMPLE II

Equal portions of 0.6 N, 1.2 N, 1.5 N, 2.0 N, and 3.0 N ammonium hydroxide were prepared by dilution of the 5 N product and placed in open vessels. In each of these five portions of ammonium hydroxide was dissolved such an amount of arsenious oxide that the ratio of dissolved arsenious oxide to dissolved ammonia in all instances was 0.25.

There was then placed in each of the five ammonium-arsenious oxide solutions an equal amount of metallic copper of the same type as that employed in Example I and which in all instances constituted a stoichiometric excess with respect to the arsenious oxide present.

The production of copper ammonium arsenite from each of the five reaction mixtures was then effected by passing air therethrough at the same rate and under the same conditions and for the same length of time as in Example I.

The results of the five tests are recorded in Table II.

*Table II*

| Normality of Original Solution | | Equivalents, Metallic Copper Dissolved |
|---|---|---|
| $NH_3$ | $As_2O_3$ | |
| 0.6 | 0.12 | 0.065 |
| 1.0 | 0.25 | 0.08 |
| 1.2 | 0.30 | 0.12 |
| 1.5 | 0.38 | 0.52 |
| 2.0 | 0.5 | 0.6 |
| 3.6 | 0.92 | 0.8 |

Figure 2:
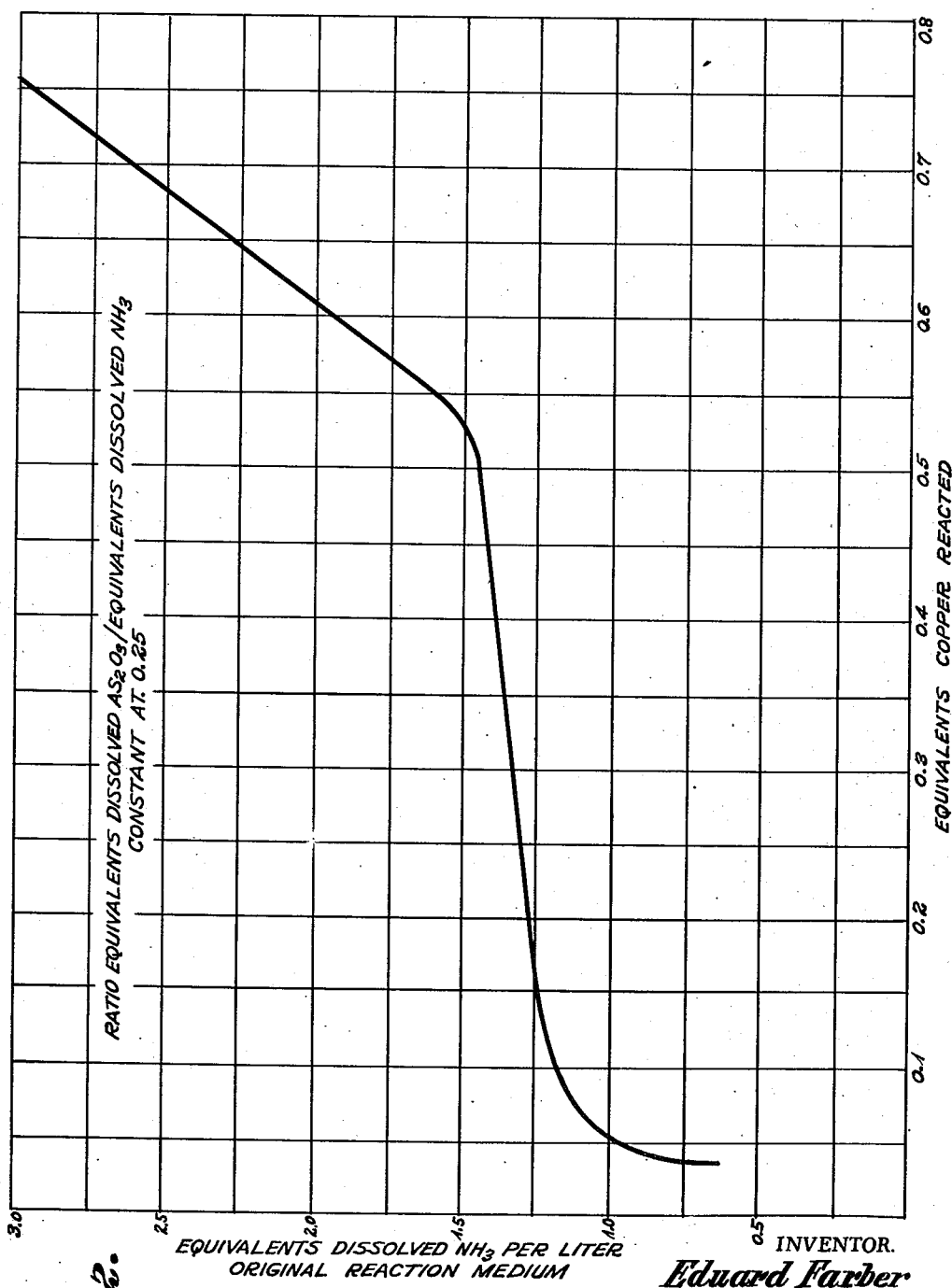

The data set forth in the foregoing table which are graphically represented in Figure 2, illustrate that the extent and rate of reaction of the metallic copper is a function of the dissolved ammonia concentration of the original reaction solution as well as of the dissolved arsenious oxide concentration thereof, as shown by Example I.

These two examples in combination, therefore, demonstrate that the concentration of dissolved ammonia and the concentration of dissolved arsenious oxide are interdependent variables which determine the extent and rate of the reaction by which the desired cupric ammonium arsenite is produced, and further, that these interdependent variables must be properly adjusted to secure the desired result.

It is further apparent from the data of Table II and from Fig. 2 that the extent of the reaction by which the cupric ammonium arsenite is formed is not appreciable, even in the presence of an optimum concentration of arsenious oxide, until the concentration of dissolved ammonia in the original reaction solution approximates about one equivalent per liter.

Likewise, the table indicates that the rate of reaction of metallic copper increases only gradually as the concentration of dissolved ammonia in the original reaction mixture is increased beyond about 1.5 equivalents per liter.

It should be noted that the data of this example obtain when the ratio of equivalents dissolved arsenious oxide per liter to equivalents of dissolved ammonia per liter is 0.25.

Analogous results are obtained from the use of reaction mixtures in which the relative concentration of arsenious oxide is increased to about 0.6 equivalents per equivalent of dissolved ammonia per liter of original reaction medium.

EXAMPLE III

A reaction mixture was prepared by dissolving in a portion of 2 normal ammonium hydroxide .25 equivalent of arsenious oxide per liter of dissolved ammonia and suspending therein particles of metallic copper screen in stoichiometric excess with respect to the dissolved arsenious oxide present.

Air was passed through this reaction mixture at the rate of about 7 cubic feet per liter of solution per hour and the concentration of cupric ion formed was determined after one-half hour, one hour, and two hours of reaction. The results of these determinations are set forth in Table III.

*Table III*

| Time in Hours | Equivalents per Liter Copper Reacted |
|---|---|
| ½ | 0.54 |
| 1 | 0.48 |
| 2 | 0.60 |

The foregoing data illustrate that the reaction by which the cupric ammonium arsenite solution is formed is essentially complete after aeration for one-half hour. In fact, aeration for an additional half-hour actually decreased the yield, while aeration for two hours effected only an insignificant increase.

EXAMPLE IV

A series of experiments were carried out in the manner as described in Example I. In this case the relative amounts of ammonia and arsenious oxide dissolved in the original reaction solutions and the corresponding results obtained are indicated in Table IV.

*Table IV*

[All parts are in equivalents per liter]

| No. | Original Reaction Solution | | | Copper Dissolved |
|---|---|---|---|---|
| | $NH_3$ | $As_2O_3$ | Ratio $As_2O_3$/$NH_3$ | |
| 1 | 0.6 | 0.0 | 0.0 | 0.03 |
| 2 | 1.2 | 0.0 | 0.0 | 0.04 |
| 3 | 0.6 | 0.12 | 0.2 | 0.07 |
| 4 | 1.3 | 0.4 | 0.30 | 0.54 |
| 5 | 2.0 | 1.2 | 0.6 | 0.70 |
| 6 | 3.0 | 0.9 | 0.3 | 0.83 |

The data of Table IV are in accordance with the teachings of the Examples I and II.

Thus the metallic copper does not react appreciably in the presence of an original reaction mixture which contains 0.6 equivalents of dissolved ammonia but no dissolved arsenious oxide per liter. Nor does doubling the concentration of dissolved ammonia effect a significant increase in the extent of such reaction. Likewise, the addition of arsenious oxide to the original reaction solution containing 0.6 equivalents of dissolved ammonia per liter fails to effect the reaction of an appreciable amount of metallic copper.

However, when the concentration of dissolved ammonia in the original reaction solution is increased to 1.3 equivalents per liter and the concentration of dissolved arsenious oxide is increased to 0.3 equivalents per equivalent of dissolved ammonia, the reaction proceeds rapidly. Furthermore, this desirable reaction rate is maintained and increases as the concentration of ammonia is increased to about 3 equivalents per liter and the ratio of equivalents of dissolved arsenious oxide to equivalents of dissolved ammonia is increased to 0.6.

EXAMPLE V

The procedure of the foregoing example was modified by the addition of a small amount of boric acid to that of the original solution.

Thus there were dissolved in a portion of 2 normal ammonium hydroxide contained in an open vessel 0.5 equivalents per liter of arsenious oxide and 0.2 equivalents per liter of boric acid. Into this solution was placed copper wire in stoichiometric excess with respect to the arsenious oxide present.

Air was passed through the reaction mixture at the rate of about 7 cubic feet per liter of the original reaction solution for a period of about thirty minutes.

At the termination of the reaction period a product containing 0.42 chemical equivalents of copper per liter was obtained.

The metallic copper employed in the process of this invention may be in any desired form. Thus, copper sheets or wire may be utilized. Likewise, copper in the form of filings, turnings, or other discrete particles may be employed. Copper plated metal scrap may be used if desired. It is preferred, however, that the metal be in such form as to present a relatively large surface area to the reaction medium.

Arsenates are characterized by a much lesser degree of toxicity than are arsenites. Hence it is essential, in the process of this invention to preclude the oxidation to the arsenate form of the arsenious oxide employed and of the cupric ammonium arsenite produced.

This result is achieved by maintaining at all times in the reaction medium a stoichiometric excess of metallic copper with respect to the arsenious material present. The maintenance of such an excess of copper accordingly constitutes a critical and essential feature of this invention.

As indicated by the examples, it is also critical to the success of the process of this invention that the original reaction medium have dissolved therein at least about one equivalent per liter of ammonia. Likewise the utilization of a reaction medium containing more than about three equivalents per liter of dissolved ammonia is unsatisfactory.

It is, therefore, preferred that the original reaction medium contain from about 1 to 3 equivalents of dissolved ammonia. A particularly desirable concentration of dissolved ammonia is from about 1.2 to about 1.5 chemical equivalents per liter. If desired, all, or a portion of the requisite ammonia may be introduced into the reaction mixture in the form of a gas in conjunction with the free oxygen containing gas utilized.

Likewise, as shown in the examples, it is essential that the original reaction medium contain in solution at least about 0.25 chemical equivalent of arsenious oxide per equivalent of dissolved ammonia. The rate and extent of the reaction by which the cupric ammonium arsenite is formed may be enhanced by increasing to about 0.6 the ratio of equivalents of dissolved arsenious oxide with respect to the equivalents of dissolved ammonia per liter of original reaction medium. It is preferred, however, that the concentration of dissolved arsenious oxide fall within the range of from about 0.25 to about 0.3 equivalents per equivalent of dissolved ammonia present in the original medium.

If desired, the reaction may be initiated in a reaction medium containing a relatively small proportion of arsenious oxide, and additional arsenious oxide added as the reaction proceeds. This method is particularly advantageous when relatively large amounts of arsenious oxide are employed.

The reaction by which the desired cupric ammonium arsenite is produced may be initiated by passing air, or other free oxygen containing gas through the reaction mixture comprising metallic copper suspended in an ammoniacal arsenious oxide solution. Essentially pure oxygen, or oxygen diluted with an inert gas such as nitrogen may be so employed. Air is preferred.

The aeration of the reaction mixture may be carried out at any desired rate. Generally speaking, there should be present at all times an excess of free oxygen, that is, the rate of supply of oxygen should exceed the rate at which it is consumed by the dissolved metallic copper. It is apparent that the most desirable aeration rate will vary with the particular oxygen containing gas employed.

Optimum rates of aeration are, to some extent, likewise a function of the form of the metallic copper employed. Thus when the copper employed presents a large surface area to the reaction medium, relatively high rates of aeration may be utilized, whereas low aeration rates are desirable when the surface development of the copper utilized is small.

In any event, those skilled in the art will readily be able to select the optimum aeration rate for the particular oxygen containing gas and the form of copper employed.

The preferred aeration rate when air is employed as an oxygen containing gas and copper in the form of wire or discrete particles is utilized, is from about 6 to about 10 cubic feet per hour per liter of original reaction solution.

In any event, it is a significant feature of this invention that the reaction of an adequate amount of metallic copper is effected by a short period of aeration in the presence of dilute ammonium hydroxide. A preferred period of aeration is from about 15 to about 45 minutes.

Prior art process entailing the oxidation of metallic copper in the presence of aqueous ammonia employs the use of quite concentrated ammonium hyroxide solutions and aeration for a period of at least several hours.

Preferably the reaction is effected at a temperature from about 10° C. to about 40° C. However, the temperature may be varied somewhat beyond these limits if so desired.

The temperature of the reaction mixture will tend to rise during the course of the reaction as a consequence of the exothermic nature thereof. This effect is of particular significance when the maximum feasible concentrations of ammonia are present in the original reaction medium. Thus when reaction solutions which are about 2 normal with respect to dissolved ammonia are employed, the temperature rise during aeration may be as much as 20° C., whereas in the case of starting solutions which are about 3 normal with respect to dissolved ammonia the temperature rise during the course of the reaction may be as much as 40° C. Operation at temperatures in excess of 40° C. is undesirable as a consequence of the attendant increase in the amount of ammonia lost by evaporation.

Such loss of ammonia may be reduced to some extent, however, by initiating the reaction in the presence of a reaction medium containing relatively small amounts of ammonia and increasing the ammonia to the desired strength during the course of the aeration.

For example, arsenious oxide may be dissolved in an ammoniacal solution only one normal with respect to ammonia, aeration initiated, and additional ammonia added during the reaction period to form an appropriate solution thereof.

Alternatively, a measured amount of ammonia gas may be admixed with the air introduced into the reaction medium by the aeration system.

If desired, the ammonia lost by volatilization may be recovered by conventional methods, such as scrubbing or by absorbing the ammonia in suitable absorbents.

The process of this invention is particularly advantageous from a commercial standpoint in that it may readily be practiced either as a batch or a continuous operation.

Figure 3:
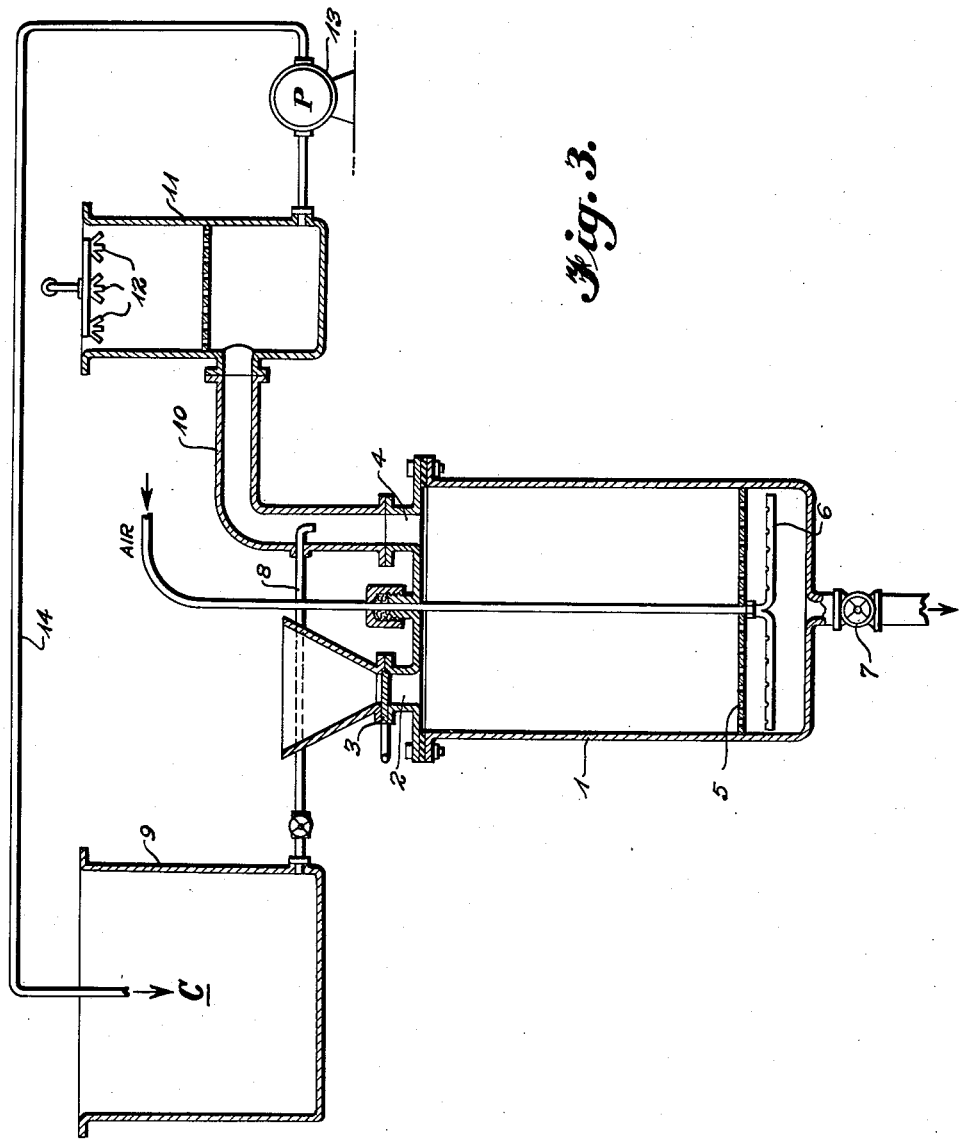

One type of apparatus in which the operation of this invention may be carried out is diagrammatically represented in Fig. 3. In the figure, 1 represents a reaction tank equipped with an inlet orifice 2 having a closure 3, a gas outlet orifice 4, a perforated bottom insert 5, an aerator 6, and a reaction product outlet 7. The gas outlet orifice 4 is connected by means of conduit 8 to chemical make-up tank 9 and by means of conduit 10 to scrubbing tank 11. Scrubbing tank 11 is equipped with water inlets 12 and connected through pump 13 and conduit 14 with chemical make-up tank 9.

In batch operation the reaction tank 1 is charged with the desired amount of metallic copper through orifice 2 which is then closed by means of closure 3. Tank 1 is then filled through the gas outlet 4 by means of conduit 8 with an aqueous solution of ammonia and arsenious oxide which has been prepared in chemical make-up tank 9.

The reaction is then initiated by passing air or other oxygen containing gas through the reaction mixture by means of aerator 6. The ammonia-rich off gas produced escapes through gas outlet 4 and passes through conduit 10 into scrubbing tank 11 where it is scrubbed with water from inlets 12. The resultant ammonia-containing wash water is passed by means of circulating pump 13 through conduit 14 into chemical make-up tank 9.

Although only one scrubbing tank is shown in the figure, several may be employed if so desired.

From the reaction tank 1 the copper ammonium arsenite solution produced is removed through outlet 7 and the cycle repeated.

The invention may be practiced in a continuous manner in the above-described apparatus by initiating the discharge of the copper ammonium arsenite reaction product about thirty minutes after the reaction has been started and by maintaining such discharge at a rate approximately equivalent to that at which the copper ammonium arsenite solution is formed.

Fresh ammonium-arsenious oxide solution must, of course, be introduced into the reaction tank 1 from the chemical make-up tank 9 at approximately the same rate.

Arsenious oxide is preferably supplied to the chemical make-up tank 9 in the form of an aqueous slurry.

Ammonia gas may be dissolved in water contained in chemical make-up tank 9 or if desired may be introduced directly into reaction tank 1 in conjunction with air by means of aerator 6.

Cupric ammonium arsenite wood impregnating solutions prepared in accordance with the process of this invention may contain arsenious and divalent copper ions in concentrations of from about 0.4 to about 0.6 chemical equivalents per liter, and from about two to about four equivalents of dissolved ammonia per chemical equivalent of divalent copper present. Cupric and arsenious ions are customarily produced in approximately stoichiometric proportions.

These cupric ammonium arsenite solutions rapidly and effectively penetrate wood and other cellulosic materials and upon volatilization of the ammonia and water contained therein deposit in the wood fibers toxic residue essentially free of water-soluble materials which are remarkably resistant to leaching by moisture. Hence wood impregnated with a solution prepared by the process of this invention is essentially permanently protected against the ravages of termites, insects, and other destructive organisms.

In addition, the wood impregnating solutions of this invention are essentially free of water-soluble ionizable salts. Hence, wood and materials impregnated with these solutions demonstrate a very low electrical conductivity.

This fact is of great significance in the field of poles and other wooden materials utilized to carry wires conducting electrical currents.

To demonstrate the remarkable advantages which attend the process of this invention insofar as the electrical conductivity of the impregnated and dried wooden products is concerned, a series of comparative tests with the representative wood impregnating solutions of the prior art were carried out.

The prior art impregnating solution tested was prepared with the teachings of U. S. 2,149,284 to Gordon, by dissolving copper sulfate in water, precipitating cupric hydroxide by the addition of sodium hydroxide to the copper hydroxide solution, removing and washing the cupric hydroxide precipitate, dissolving the washed cupric hydroxide in an excess of ammonia and adding to the resultant ammoniacal solution a predetermined amount of arsenious oxide.

Comparative tests with this prior art solution and the solutions prepared by the process of this invention were made by an independent, disinterested laboratory, in the manner described in Example V.

EXAMPLE VI

Pieces of white fir wood approximately 3 inches long, 2 inches wide and ½ inch thick were impregnated under identical conditions with each of the solutions to be tested. Approximately equal amounts of both solutions were absorbed by the fir wood pieces impregnated.

The impregnated wood samples were dried after impregnation and conditioned to about 12% moisture. The volume resistivity of the samples was then determined in accordance with ASTM Method D257-46. The samples were then maintained at 77° F. and 90% relative humidity for a period of one week and the volume resistivity thereof was again determined. The results of these tests are tabulated in Table IV.

The electrical resistance determinations were made with a general radio type 544-B megohm bridge. Readings were taken after testing for one minute at an applied potential of 500 volts direct current.

*Table V*

| Sample | Volume Resistivity | |
|---|---|---|
| | 12% Moisture | After 1 week, 77° F., 90% Rel. H. |
| Prior Art Solution | 49 | 1.15 |
| Solution of this Invention | 2,300 | 10 |

It is apparent from the foregoing table that the wood impregnated with the copper ammonium arsenite solutions prepared by the process of this invention demonstrates a much greater resistance to the passage of electrical current and hence a remarkably lower degree of conductivity than does similar wood impregnated with the solutions of prior art.

I claim as my invention:

1. A process for the production of a cupric ammonium arsenite wood impregnating solution substantially free of arsenates which comprises contacting with a free oxygen containing gas at a temperature of about 10° C. to about 40° C., an aqueous ammoniacal arsenious oxide solution having metallic copper in contact therewith, said aqueous ammoniacal arsenious oxide solution containing from about 1 to about 3 equivalents of dissolved ammonia per liter and from about 0.25 to about 0.6 equivalent of dissolved arsenious oxide per equivalent of dissolved ammonia, said metallic copper being present throughout the reaction in a stoichiometric excess with respect to the arsenical material present, said free oxygen containing gas being supplied at a rate adequate to provide an excess of oxygen throughout the reaction.

2. The process of claim 1 wherein the free oxygen containing gas is air.

3. The process of claim 2 wherein the air is passed through the reaction mixture at the rate of from about 6 to about 10 cubic feet per hour per liter of aqueous ammoniacal solution for a period of from about fifteen to about forty-five minutes.

4. A process of preparing a cupric ammonium arsenite wood impregnating solution substantially free of arsenates which comprises passing a free oxygen containing gas through an ammonical arsenious oxide solution having metallic copper in contact therewith, said solution containing from about 1.2 to about 1.5 chemical equivalents of dissolved ammonia per liter and from about 0.25 to about 0.3 equivalents of dissolved arsenious oxide per equivalent of dissolved ammonia, said metallic copper being present in stoichiometric excess throughout the process, said free oxygen containing gas being supplied at a rate adequate to provide an excess of oxygen throughout the reaction, said process being effected at a temperature of about 10° C. to 40° C. for a period of from about 15 to about 45 minutes.

EDUARD FARBER.

REFERENCES CITED

The following references are of record in the file of this patent:

UNITED STATES PATENTS

| Number | Name | Date |
|---|---|---|
| 884,298 | Schaefer | Apr. 7, 1908 |
| 1,057,076 | Monseur | Mar. 25, 1913 |
| 1,082,658 | Somermeier | Dec. 30, 1913 |
| 2,149,284 | Gordon | Mar. 7, 1939 |
| 2,263,594 | Rushton | Nov. 25, 1941 |

FOREIGN PATENTS

| Number | Country | Date |
|---|---|---|
| 782,795 | France | Dec 17, 1934 |